United States Patent [19]
Shutt et al.

[11] 3,721,497
[45] March 20, 1973

[54] RING LASER GYROSCOPE LINEARIZATION SYSTEM

[75] Inventors: Sidney G. Shutt, Brea; Thomas J. Hutchings, Orange, both of Calif.; James T. Hoffman, Kettering, Ohio

[73] Assignee: North American Rockwell Corporation, El Segundo, Calif.

[22] Filed: April 19, 1971

[21] Appl. No.: 135,200

[52] U.S. Cl. ............................................. 356/106 LR
[51] Int. Cl. ................................................ G01b 9/02
[58] Field of Search ............................... 356/106 LR

[56] References Cited

UNITED STATES PATENTS 3,323,411   6/1967   Killpatrick ..................... 356/106 RL Primary Examiner—Ronald L. Wibert
Assistant Examiner—V. P. McGraw
Attorney—L. Lee Humphries and H. Frederick Hamann

[57] ABSTRACT

The invention is directed to a system which operates in combination with a ring laser type gyroscope having an output defined by the equation $\psi = \Omega \ 30 \ \Omega_L \sin(\psi + \epsilon)$ such that the system drives the term $\epsilon$ to zero. In the equation $\Omega$ is the input rotation rate of the ring laser gyroscope, $\Omega_L$ is the lock-in rate or that rate below which no output is obtained due to frequency entrainment of the two optical oscillators, $\psi$ is the instantaneous phase difference between the two optical oscillators and $\epsilon$ is the phase angle at time, $t$, equal to zero. Additional electronic circuits then allow the complete term to be reduced to zero.

6 Claims, 4 Drawing Figures

INVENTORS
SIDNEY G. SHUTT
THOMAS J. HUTCHING
JAMES T. HOFFMAN
BY
*Edward Dugas*
ATTORNEY PHOTODIODE
CURRENT
$I \alpha \sin \psi$

INVENTORS
SIDNEY G. SHUTT
THOMAS J. HUTCHING
BY JAMES T. HOFFMAN

*Edward Dugas*
ATTORNEY

RING LASER GYROSCOPE LINEARIZATION SYSTEM

BACKGROUND OF THE INVENTION

A typical ring laser gyroscope consists of a square or triangular light path with highly reflecting mirrors at the corners thereof. The source of light consists of, for example, at least one helium-neon gas discharge tube positioned in the optical path of one of the arms of the triangle or square such that a generated oscillating laser beam traverses the ring in opposite directions and is partially transmitted through one of the reflectors which is a partial reflector. Two output beams are thereby produced and these two beams are combined and applied to a photo responsive element to form electrical signals which signals are compared to provide information as to the direction of rotation of the laser ring and the rate of rotation. Two major problems are encountered with this type of system. One is frequency lock-up which occurs when the frequency difference between the two counter-rotating beams falls below a certain threshold value at which times the two counter-rotating beams lock to each other and no angular difference information is available at the output. Another problem exists in that just above these locking frequencies there is a non-linear output region which again causes errors in the angular positioning information received from the ring laser gyroscope.

Applicant's invention is directed to this last named problem such that he provides a system for linearizing the output of the ring laser gyro down to the frequencies where phase locking occurs.

SUMMARY OF THE INVENTION

In one preferred embodiment of the invention, one of the output beams from the ring laser gyroscope is directed to a piezoelectric mirror and from there is reflected on to a beam splitter along with the oppositely rotating output beam to form a combined beam. The combined beams are then detected by photodetecting means as an AC signal. A counter means receives the AC signal from the photodetecting means and compares this signal with a pulse train from a clock generator for a desired period of time (in the preferred embodiment, 1 cycle). The difference in time between the positive and negative portions of a cycle of AC signal as evidenced by the difference in the number of pulses occurring for each half cycle of the AC signal over 1 complete cycle are then fed to a servo network, the output of which is fed back to the piezoelectric mirror device so as to vary the phase of one of the output beams to correspond to the oppositely rotating output beam. A second counter means receives the output from the photodetector means and processes the output in a similar manner as the first counter to provide an identical output signal. A third counter means is also connected to the photodetector means for counting the elapsed time in terms of pulses from the clock means per unit event (which again in the preferred embodiment, is 1 cycle). The output from the counter means is fed to a ratio multiplier which multiples the input from the second counter means by a constant equal to $\pi/2$ and divides this result by the accumulated signal from the third counter means. The output from the ratio multiplier is then fed to a cosecant generator with the output of the cosecant generator being fed to an accumulator. The accumulator output is the output of the system which output is normally fed to the guidance system and is a numerical output that is equal to the actual number of pulses that would have been counted if the ring laser gyroscope were perfectly linear outside the initial lock-in region.

It is, therefore, an object of the present invention to provide a system for a system for improved linearization of a ring laser type gyroscope.

It is an additional object of the present invention to provide a simple and inexpensive system for linearizing the output signals from ring laser gyroscopes.

The aforementioned and other objects of the present invention will become more apparent when taken in conjunction with the following description and drawings throughout which like characters indicate like parts and which drawings form a part of this application.

DESCRIPTION OF THE PREFERRED EMBODIMENT

Figure 1:
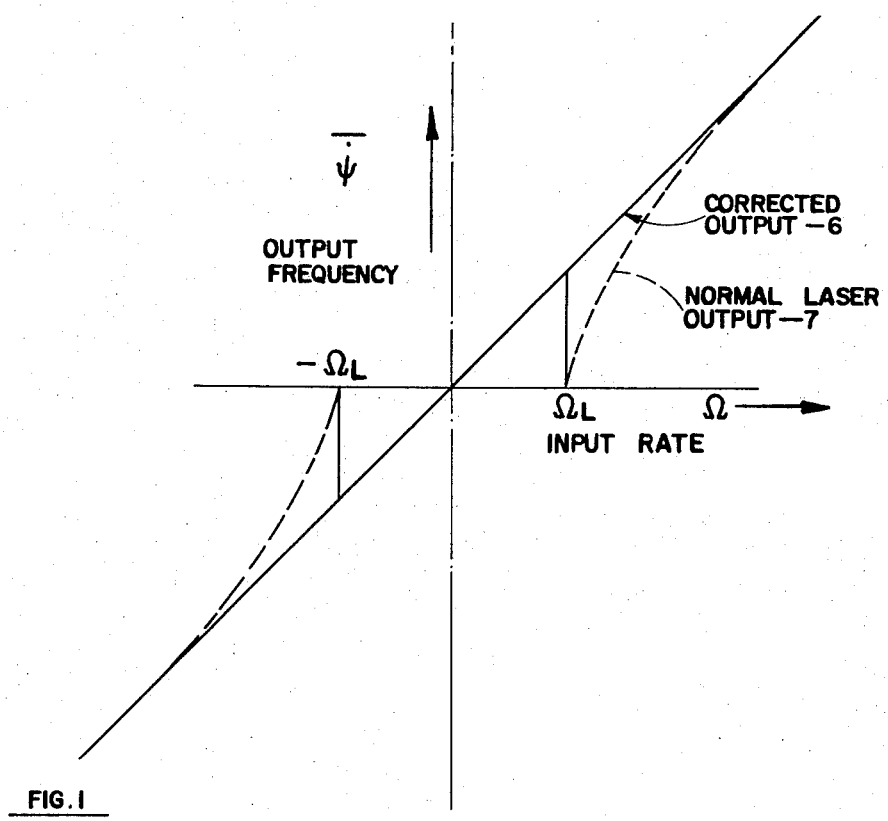
FIG. 1 is a graph illustrating the normal ring laser gyroscope output and the corrected gyroscope output.

Referring to FIG. 1; FIG. 1 illustrates the normal or typical output of a ring laser gyroscope as dotted curve 7. Between the values $-\Omega_L$ and $\Omega_L$, we have the locking frequency, that is, the frequency at which the two counter-rotating beams lock to each other and no rate information is available. As can be seen, shortly thereafter, an output is available but it is non-linear for a considerable distance above and below the locking rates. Applicants' system and technique corrects the output of the ring laser gyroscope such that it follows the corrected output curve 6. Applicants' system does not eliminate the locking technique and this phenomena still exists in ring lasers using applicants' system and technique.

Figure 2:
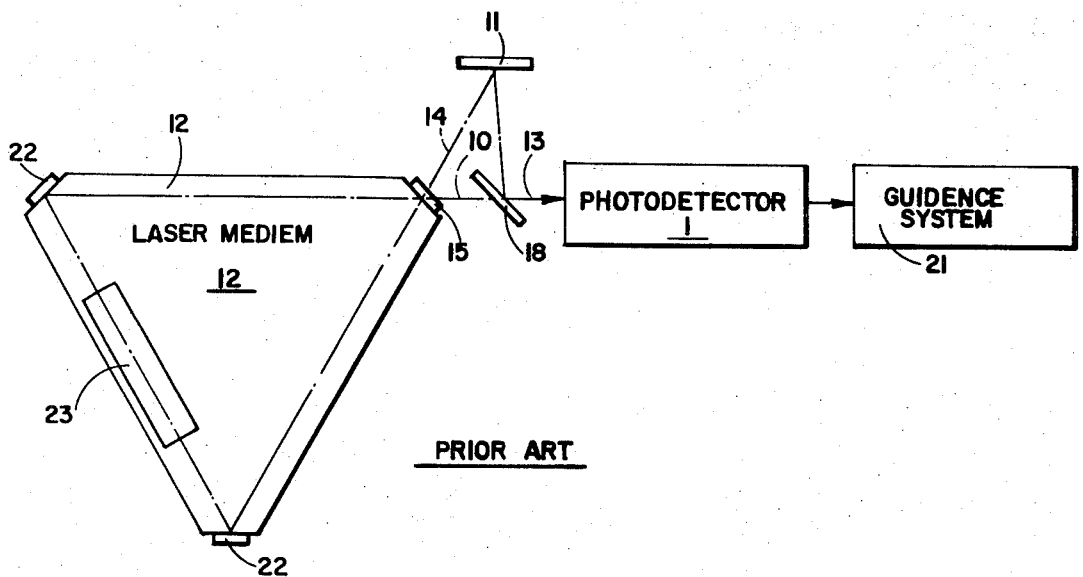
FIG. 2 illustrates the prior art ring laser gyroscope.

Referring to FIG. 2 wherein a prior art ring laser type gyroscope 12 of the triangular type is shown with a lasing medium 23, two totally reflective mirrors 22, and a partially reflecting mirror 15. In operation, the laser medium 23 generates two counter-rotating beams which reflect around the close path formed by the mirrors 22 and 15. Mirror 15, being partially reflective, allows a portion of the counter-rotating beams to be transmitted out from the closed optical path of the ring type laser. One of the beams, labeled 14, reflects from a mirror 11 and is directed towards a beam-splitter element 18. The other counter-rotating beam 10 is directed to the beam-splitter element and combines with the beam 14 to form a composite beam 13. The photodetector 1 receives this combined beam 13, determines the difference between the two beams in terms of phase, and provides an output signal proportional to the sine of this difference. The output difference signal is directly proportional to the rate at which the ring laser gyroscope is rotated. In a normal system environment, this output is fed to a guidance system 21 which is used to guide a vehicle along a preselected course. The following list of patents illustrate this particular concept in various forms: U. S. Pat. Nos. 3,320,850, 3,392,622, 3,395,270, 3,411,849, 3,473,031, 3,503,005, 3,545,866 and 3,512,890.

The conventional ring laser gyroscope produces an AC signal at a photodetector 1 which is located in the path of the combined beam 13 which current designated "I" is equal to sin $\psi$ where $\psi$ is given by the solution of the differential equation $$\dot{\psi} = \Omega + \Omega_L \sin(\psi + \epsilon) \qquad \text{Eq. (1)}$$

where $\Omega$ is the input rotation rate to the instrument and $\Omega_L$ is the "lock-in" rate or that rate below which no output is obtained due to frequency entrainment of the two counter-rotating beams. The value $\psi$ is the instantaneous phase difference between the two optical oscillators measured at the detector where $\epsilon$ is the phase angle at time, $t$, equal to zero. The plot of the average value of $\psi$ versus $\Omega$ of this equation is given in FIG. 1 as the normal curve 7. For review, when the ring laser gyroscope is rotated in inertial space, the counter-rotating beams (commonly called oscillators) oscillate at different frequencies. This causes the fringe pattern to translate across the photodetector, resulting in the AC signal varying cyclically at a rate equal to the number of fringes per second passing the detector. The number of fringes is equivalently the number of cycles of current per unit time which is dependent on the rotation rate of the ring laser gyroscope. In the typical guidance system shown in FIG. 2, the signal current is AC coupled to the counter where the pulses are accumulated for a period of time determined by the guidance system requirements. Each pulse there represents an angular increment.

Figure 3:
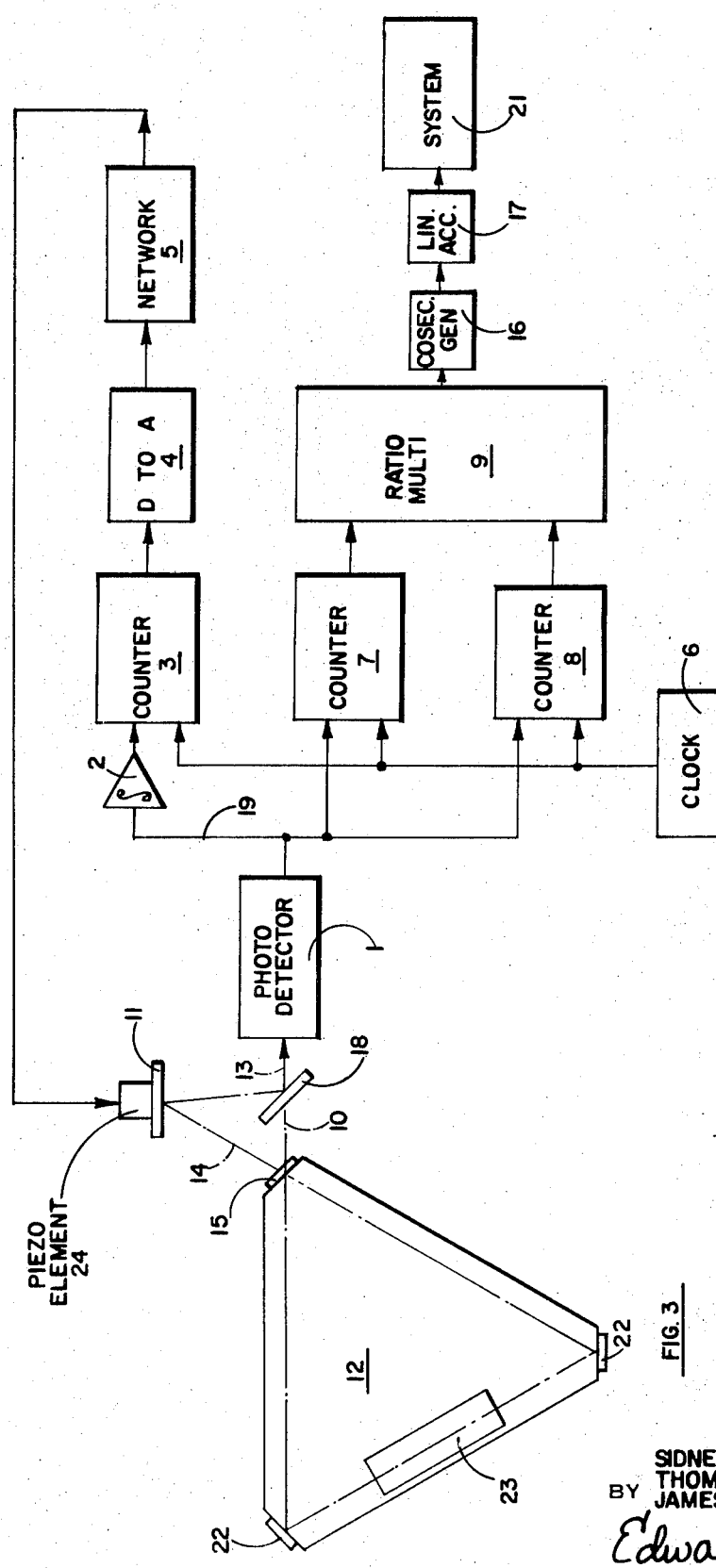
FIG. 3 illustrates the preferred embodiment of the invention in block diagram form.

Referring now to FIG. 3, in applicants' system the same laser gyroscope 12 is used with the output beams from the partially transmitting mirror 15 being directed along the same paths. That is, beam 14 is directed to mirror 11 and from there to the beam-splitter element 18. A modification made to the basic structure is that a piezoelectric driver 24, or similar type of driver, is attached to the rear surface of the mirror 11 so that the mirror may be positioned as a function of an electrical signal. The desired result is to allow the phase of the fringe pattern to be adjusted by means of the mirror such that the integrated photodetector signal 19 averages to zero over 1 cycle. This results in the $\epsilon$ term of equation (1) being driven to zero. The combined output beam 13 is fed to the photodetector 1. The output of the photodetector is the current I which has a phase relationship defined by Equation (1). This current I is fed to an integrator 2, a second counter 7, and a third counter 8. The integrator integrates the I signal and feeds it to a first counter 3. The signal from the integrator 2 then is equivalent to the cosine $\psi$ of Equation (2). This signal is then introduced into the B channel of a regular UP-DOWN counter 3 which operates in the mode of A function B per elapsed B. A high frequency reference clock rate is fed to the A channel of the counter from clock means 6. The operation of the first counter 3 is as follows: When the signal on the B channel is positive, the clock pulses from clock means 6 are added to the accumulator in counter 3. When the input signal is negative at B, the clock pulses are subtracted from the accumulator. At the end of the complete cycle of the signal at input B the accumulator outputs a signal to the digital-to-analog converter 4. The accumulator is then reset to zero and starts counting again. The accumulated counts along with their sign, positive or negative, are then processed by the digital-to-analog converter. The output of converter 4 is transmitted to a servo stabilizing network 5 which has the required transfer function to maintain servo stability of the loop over the operating range of the gyroscope. The output from the servo network 5 is then applied to the piezoelectric driver 24 closing the servo loop with the proper phase to reduce the magnitude of the error signal $\epsilon$ derived by the counter towards zero. The second counter 7 is a counter which operates identically to counter 3. Counter 7 does not receive the cosine $\psi$ signal but receives the signal directly from the photodetector 1 before integration. The third counter means 8 is a counter operating in the mode of time pulses per elapsed event, that is, the number of accumulated time pulses is outputed after one cycle of input from the photodetector 1. These two accumulated totals are then fed to a ratio multiplier 9. Unit 9 multiples the input from counter 7 by a constant equal to $\pi/2$ and divides this resultant by the accumulated signal from counter 8. The resultant signal from this operation is fed to a cosecant generator 16 with the output of the cosecant generator being fed to a linear accumulator 17. The numerical output of accumulator 17 is the actual number of pulses that would have been counted if the gyroscope were perfect outside the lock-in region and is effectively the corrected linearized output signal. The accumulator 17 is then sampled at its output by the guidance system 21 when information is needed.

Figure 4:
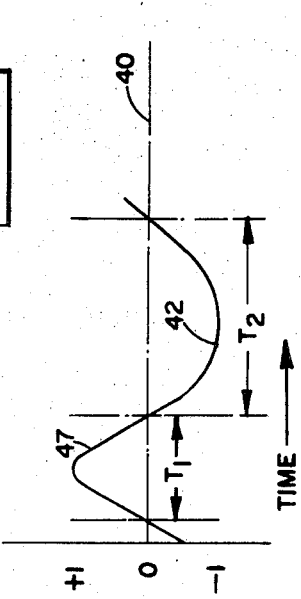
FIG. 4 illustrates a waveform useful in understanding the operation of the embodiment of FIG. 3.

Referring to FIG. 4; a plot of the sin $\psi$ signal portion of the photodetector output (signal 19) is shown in this figure for the average of the cos $\psi$ portion equal to zero over 1 cycle. The counter 7 operates to find the value of $T_1 - T_2$. The counter 8 operates to find the value of $T_1 + T_2$. The output of the accumulator is thus defined as Equation (2). The solution of Equation (1) for the sin $\psi$ and subsequent error of actual input to actual output yields this value (Equation 2) as the required correction amount for each cycle of output. As the actual input rate decreases towards the lock-in rate, the sin $\psi$ becomes more and more distorted and the amount of error becomes large. The correction factor derived by the described system becomes large, therefore, linearizing the gyroscope output down to the point of lock-in.

$$\operatorname{cosec} (\pi/2) (T_1 - T_2/T_1 + T_2) \qquad \text{Eq. (2)}$$

While there has been shown what is considered to be the preferred embodiment of the present invention, it will be manifest that many changes and modifications may be made therein without departing from the essential spirit of the invention. It is intended, therefore, in the annexed claims, to cover all such changes and modifications as fall within the true scope of the invention.

We claim:

1. In combination with a ring laser gyroscope having as an output two counter rotating beams, a linearizing system comprised of:

drive means interposed in the optical path of one of said output beams for changing the optical path of said beam in response to a control signal;

combining means for combining the other of said output beams with the output beam from said drive means;

detector means for converting said combined optical beam into an AC signal; and comparing means receiving said AC signal from said detector means and for providing said control signal to said drive means which signal is proportional to the average of said AC signal for at least 1 cycle of time, whereby said control signal activates said drive means to change the optical path of said one output beam to reduce the average towards zero.

2. The linearizing system according to claim 1 wherein said drive means is comprised of:
a mirror; and
a piezoelectric driver affixed to the rear of said mirror with said mirror positioned to deflect said one output beam to said combining means.

3. The linearizing system according to claim 1 and further comprising:
clock means providing a continuous train of pulses to said comparing means for comparison against said received AC signal such that the symmetrical difference between said received AC signal appears as a corresponding number of pulses.

4. The linearizing system according to claim 1 wherein said comparing means include an integrator for integrating the combined beams from said combining means.

5. In combination with a ring laser gyroscope having as an output two counter-rotating beams, a linearizing system comprised of:
drive means interposed in the optical path of one of said output beams to vary the path length of said beam;
combining means for combining the beam from said drive means with the other of said counter-rotating output beams;
means for converting said combined beams into a proportional AC signal; and
means for receiving said proportional AC signal and for providing a control signal to said drive means which signal is proportional to the non-symmetry of said proportional AC signal, such that said drive means varies the optical path length of said one output beam to cause said proportional AC signal to be symmetrical.

6. The linearizing system according to claim 5 and further comprising:
a clock means for providing a continuous train of pulses;
a counter means receiving at one input terminal thereof said provided train of pulses and at another input terminal thereof said proportional electrical signal, said counter means providing an accumulated count of pulses equal to the time difference between alternate half cycles of said proportional electrical signal;
another counter means receiving at one terminal thereof said provided train of pulses and at another input terminal thereof said proportional electrical signal, said another counter means providing an accumulated signal proportional to the number of pulses occurring during one cycle of said proportional electrical signal;
means for multiplying the provided accumulated pulses from said counter means by a constant value $\pi/2$ and for driving said product by the accumulated signal from said another counter means to provide an output signal;
cosecant means for receiving the output signal from said means for multiplying and for forming the cosecant thereof; and
accumulator means for accumulating the output of said cosecant means and for providing said accumulated signal as an available output signal proportional to the angle of rotation of said ring laser gyroscope.

* * * * *